April 5, 1960
R. C. LAFFLER ET AL
2,931,140
CARTRIDGES FOR FERTILIZERS, FUNGICIDES
AND/OR INSECTICIDES
Filed May 13, 1958
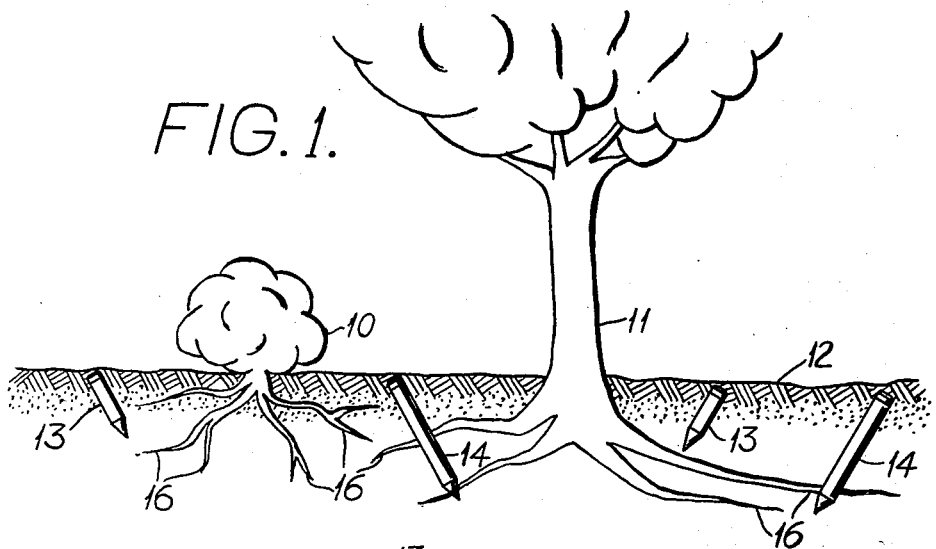
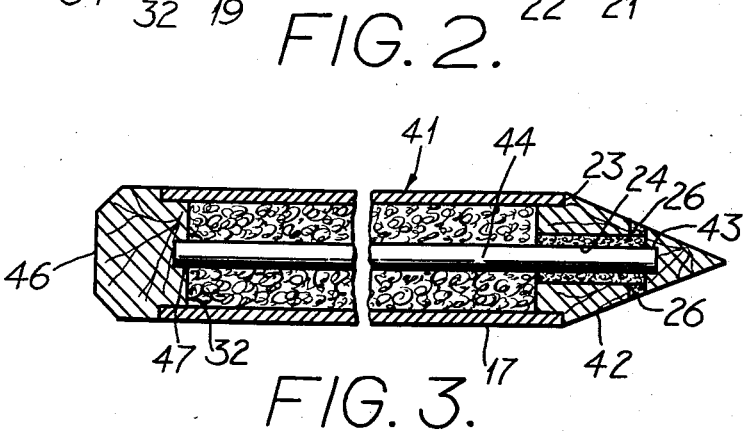
INVENTORS
ROBERT C. LAFFLER
CARL ROMBOUGH
By Richard Rawling
THEIR ATTORNEY

United States Patent Office 2,931,140
Patented Apr. 5, 1960

2,931,140

CARTRIDGES FOR FERTILIZERS, FUNGICIDES AND/OR INSECTICIDES

Robert C. Laffler, Bergenfield, and Carl Rombough, Point Pleasant, N.J.; said Laffler assignor to said Rombough Application May 13, 1958, Serial No. 735,017

2 Claims. (Cl. 47—48.5)

The present invention relates generally to containers for dispensing fertilizers, fungicides and/or insecticides, and it has particular relation to a cartridge type of container that may be driven into the ground around bushes and/or trees to discharge a given quantity of such materials over an extended period of time and in proportion to the amount of moisture in the ground.

Heretofore, fertilizers have been made into the form of rods or sticks having a pointed end for facilitating insertion into the ground. In some instances, the fertilizer was mixed with plaster-of-Paris, or peat moss, to provide a form-retaining mass. In other instances, the fertilizer was contained in a form-retaining cartridge made of metal or plastic, which container was provided with perforated sides to permit the passage of moisture therethrough to carry the same into the ground by leaching the same therefrom. These forms of cartridges had a great many disadvantages and never became popular. The cartridges made of a mixture of fertilizer and plaster-of-Paris or peat moss broke easily during insertion in the ground, and disentegrated quickly and proportionately to the amount of moisture in the ground. In many instances, such cartridges had a relatively short life and provided the bushes and/or trees with too much fertilizer over a very short period of time. The cartridges made of plastic or metal, having perforated sides, likewise distributed too much fertilizer after a rain and became quickly dissipated. With these latter types of cartridges, the containers were not decomposable and they had to be dug up and removed at frequent intervals or the ground around the bushes or trees became filled with empty and useless containers of no value.

With the present invention, there is provided a cartridge for holding a quantity of material, such as for example, fertilizers, fungicides and/or insecticides that is not only capable of being driven readily into the ground around a bush or tree without danger of breaking, but also one that is made entirely of decomposable materials that throughout its existence adds nutrient value to the ground within which it has been driven and is decomposing. The cartridge of this invention is constructed with very limited openings, positioned only in its nose cone which result in a regulated withdrawal of its contents thereof. The construction is such that the contents cannot be leached out during a heavy rain storm, but the withdrawal must be effected entirely by osmotic action.

An object of the invention is to provide a rigid decomposable cartridge that may be driven in the ground around bushes or trees for the dissemination of fertilizers, fungicides and/or insecticides under controlled conditions.

A further object of the invention is the provision of such a cartridge made entirely of material that will decompose in the ground after the contents has been distributed, thereby adding further nutrient to the area.

Another object of the invention is to provide a cartridge for fertilizers, fungicides and/or insecticides which will so control the dissemination of its contents that extremely strong fertilizers, fungicides and/or insecticides may be used without exposing the bushes and/or trees to danger of burning their roots, which increase in strength of the contents justifies the cost of the cartridge.

A further object of the invention is the provision of suitable reinforcing means in the larger and longer cartridges for facilitating their insertion in the ground at substantial depths without danger of breaking.

Other and further objects and advantages of the invention reside in the detailed construction of the several parts, which result in simplicity, economy and efficiency, and which will be apparent from the following description, wherein two preferred embodiments of the invention are shown, reference being had to the accompanying drawings, forming a part hereof, wherein like numerals indicate like parts, in which:

Figure 1 is a diagrammatic view, showing a growing bush and tree above and below the ground level, and illustrating how the cartridges of the present invention may be used to disseminate fertilizers, fungicides and/or insecticides adjacent the roots thereof.

Figure 2 is a longitudinal sectional view of one of the cartridges shown in Figure 1, the same being on an enlarged scale; and Figure 3 is a fragmentary longitudinal sectional view of a modified form of cartridge, wherein a reinforcing rod is mounted axially of the container to connect the driving head thereof with its hollow nose cone.

There is shown in Figure 1 a bush 10 and tree 11 growing in the ground 12, and having a plurality of cartridges 13 and 14 embodying the invention driven into and below the surface of the ground to provide a means for feeding fertilizers, fungicides and/or insecticides to the roots 16 of said bush and tree.

The cartridge 13, as best shown in Figure 2, consists of a tubular container 17, which is of a substantial length as compared to its width dimensions and of a substantial width as compared to the thickness of its sidewalls, providing a relatively large and hollow interior 18 for the reception and storage of fertilizers, fungicides and/or insecticides 19. The container 17 is preferably made of hard pressed paper or a convolute tube of Krapt or chipboard paper, but any other material that is decomposable when buried in the ground may be used. This decomposable material of which the container 17 is made may contain a suitable binder, such as glue, sizing, etc., and its inside and outside surfaces may be treated with a moisture resistant coating of shellac or other harmless material to give the same the proper degree of stiffness and rigidity for driving into the ground under the blows of a hammer. Such treatment will also temporarily impede the absorption of water above the discharge openings in the nose cone, as will hereinafter be described in detail.

The tubular container 17, which for the purpose of illustration is shown in the drawings as being of a cylindrical shape, is adapted to be closed at one end with a wooden tapered hollow nose cone 21. The nose cone 21 has a reduced axial tubular projection 22, extending outwardly of its larger end, which provides a radially extending shoulder 23, having a width substantially equal to the thickness of the sidewalls of the container 17. The projection 22 is of a diameter adapted to fit snugly within the hollow interior 18 of the container 17 in a telescopic manner. The nose cone 22 has an axial recess 24 extending inwardly from its larger end to a distance intermediate the ends of its tapered sides, which recess 24 is in open communication with a plurality of laterally extending radial openings 26 leading to the outside thereof.

The opposite end of the tubular container 17 is adapted to be closed with a suitable driving head 31, which has a maximum diameter equal to the maximum diameter of the tubular container 17. One side of the driving head 31 is provided with a solid axial projection, having a reduced diameter substantially equal to the diameter of the hollow interior 18 of the container 16, as indicated at 32. The reduced diameter of the projection 32 provides a radial shoulder 33, having a width equal to the thickness of the sidewall of the container 17. The projection 32 is adapted to fit snugly within the hollow interior 18 of the container 16 in a telescopic manner. The peripheral edge of the opposite end of the driving head 31 may be beveled, as indicated at 34, to facilitate driving the cartridge 13 an inch or two under the ground with a hammer (not shown), having a head smaller in diameter than the diameter of the driving head 31. Thus, the top of the driving head 31 will be smaller than the opening in the ground, permitting the adjacent sod to be pushed gently over said driving head 31 to conceal the same from view.

Referring now to Figure 3, there is shown a modified form of cartridge 41, having a longer tubular container 17. In this modification, the hollow tapered nose cone 42 has an additional reduced axial recess 43 extending below the laterally extending radial openings 26 for receiving one end of an axial reinforcing rod 44, which may be made of wood or other suitable decomposable material. The driving head 46 for this cartridge 41 is similar in many respects to the driving head 31, but differ therefrom by having a reduced axial recess 47 in the end of its axial projection 32 for receiving the opposite end of the axial reinforcing rod 44. The reinforcing rod 44 is of a sufficient length to extend axially of the cartridge 17 with its lower end fitted telescopically and snugly into the recess 43 in the nose cone 42, while the opposite end of the reinforcing rod 44 will fit snugly and telescopically into the recess 47 in the driving head 46. In this construction, it will be apparent that the wooden rod 44 connects rigidly the driving head 46 directly with the nose cone 42, thereby transmitting the hammer blows directly to said nose cone 42 instead of through the sidewalls of the tubular container 17.

While the dimensions of the cartridges may be varied at will, it has been found through exhaustive experimentations that one having a diameter between one and two inches, with a sidewall thickness not exceeding one-quarter of an inch, and having a length from ten to eighteen inches, is desirable for most purposes. The size to be used in each instance must be governed by its specific use, i.e., bushes and young trees having relatively shallow roots will require the smaller sizes of cartridges 13 while larger and old trees having correspondingly deeper roots will require the use of the longer sizes of cartridges 41. Anyone skilled in gardening and in the care of trees will have no difficulty in selecting a cartridge of a proper size for a desired use.

These cartridges, having but limited openings in the nose cone for the dissemination of the contents, cannot have such contents washed or drained out quickly after insertion into the ground, as by a heavy rain. The moisture in the ground must enter through the radial openings 26 by capillary action, whereupon the fertilizer, fungicide and/or insecticide, having high water absorption qualities and characteristics, will assist in such action. When the fertilizer, fungicide and/or insecticide in the nose cone becomes saturated with moisture, the resulting solution by osmosis will be carried out into the ground to feed the adjacent roots. This action is more in the nature of an osmotic action than a leaching action, and it is strictly controlled by the amount of moisture in the ground. In other words, more fertilizer, fungicides and/or insecticides will be released during a rainy period when the bush or tree growth is most active, and the releasing power is slower during a long dry period when the bush or tree would be unable to absorb the same.

The dissolving of the fertilizer, fungicide and/or insecticide from the cartridge is slowed initially because of the small size of the radial openings in its nose cone, making it possible for the bush or tree to benefit from the slow and gradual release of the contents in small amounts until such time as it can absorb larger quantities. As the contents of the cartridge is disseminated, the radial openings become slightly larger through decomposition, thereby permitting larger quantities to be discharged after the bush or tree has become able to use the same. Also, root growth is encouraged only at a depth where roots will not easily dry out during drought, thus protecting the vigor of the tree.

With this invention, the fertilizer, fungicide and/or insecticide is released below the level of the grass roots, and the use of the cartridge cannot cause burned out areas in the lawn around the bush or tree, which will occur when a loose or bulk fertilizer, fungicide and/or insecticide is distributed on the surface of the ground around the bush or tree.

The use of this fertilizer, fungicide and/or insecticide cartridge permits the employment of a very high nitrogen fertilizer, which justifies the increased cost of the same. For example, the standard fertilizers in use today have a general formula of five parts nitrogen, ten parts phosphorus and five parts potassium, which is commonly sold as a 5—10—5 fertilizer, or ten parts nitrogen, 6 parts phosphorus and four parts potassium, which is commonly sold as a 10—6—4 fertilizer. However, with the present invention, it is possible to use safely and effectively a very high nitrogen fertilizer, having a formula as high as thirty-five parts nitrogen, eight parts phosphorus and seven parts potassium, which would be known as 35—8—7 fertilizer, thus reducing the number of cartridges required to adequately treat a bush or tree.

After the contents of the cartridge has been dissolved or disseminated therefrom, it will be apparent that the cartridge, per se, will have begun to decompose, being made entirely of material having a vegetable origin. In the process of its decomposition, it adds further nutrient to the ground and returns to a dust or powder, leaving nothing to be removed.

Although we have described and shown only two modifications which the invention may assume, it will be readily apparent to those skilled in the art that many other modifications may be made therein without departing from the spirit thereof or from the scope of the appended claims.

What we claim is:

1. A cartridge for holding a quantity of material comprising a tubular container made of a decomposable material having a substantial length as compared to its width dimension, said container having its lower end closed with a tapered hollow rigid nose cone made of a decomposable material and its upper end closed with a rigid driving head made of a decomposable material, said nose cone having a reduced axial tubular projection extending outwardly from its larger end adapted to fit snugly within the hollow of said container and lateral openings intermediate the sides of said nose cone extending outwardly from its hollow interior to the outside thereof, whereby the moisture in the ground surrounding said nose cone enters said openings and withdraws said contents through said openings by means of osmotic pressure, said driving head having a reduced axial projection extending outwardly from one end thereof adapted to fit snugly within the hollow of said container.

2. A decomposable cartridge made of substances having a vegetable origin for holding a quantity of material comprising a cylindrical paper container of substantial length as compared to its diameter having its lower end closed with a tapered hollow wooden nose cone and its upper end closed with a wooden driving head, said nose cone having a reduced axial recess at the bottom of its hollow interior for receiving one end of a wooden reinforcing rod, said nose cone having a plurality of spaced lateral openings extending through the sides of said nose cone adjacent the end of its hollow interior, whereby the moisture in the ground surrounding said nose cone enters said openings and withdraws said contents through said openings by means of osmotic pressure, and a driving head having an axial projection extending outwardly from one end thereof and adapted to fit snugly within the hollow of said container, said projection having an axial recess in its lower end, and a reinforcing rod made of decomposable material having a length to connect said driving head with said nose cone through said container and of a diameter adapted to fit snugly within the reduced axial recess of said hollow nose cone and within the axial recess of said driving head to provide a reinforcing member connecting said driving head with said nose cone when the cartridge is assembled.

References Cited in the file of this patent

UNITED STATES PATENTS

| | | |
|---|---|---|
| 806,838 | Raymond | Dec. 12, 1905 |
| 1,135,346 | Barnhart | Apr. 13, 1915 |
| 1,948,117 | Kadow | Feb. 20, 1934 |
| 1,971,390 | Van Yahres | Aug. 28, 1934 |
| 2,032,608 | Antrim | Mar. 3, 1936 |
| 2,082,712 | McIvor | June 1, 1937 |
| 2,380,721 | Brigden | July 31, 1945 |
| 2,796,701 | Mauget | June 25, 1957 |